United States Patent [19]

Kyker

[11] Patent Number: 4,594,877
[45] Date of Patent: Jun. 17, 1986

[54] PNEUMATIC DEADWEIGHT TESTER INCORPORATING DAMPENING MEANS

[75] Inventor: Robert A. Kyker, Collinsville, Okla.

[73] Assignee: EG&G Chandler Engineering Company, Tulsa, Okla.

[21] Appl. No.: 651,377

[22] Filed: Sep. 17, 1984

[51] Int. Cl.[4] .............................................. G01L 27/00
[52] U.S. Cl. ...................... 73/4 D; 138/43; 73/707
[58] Field of Search ............... 73/4 D, 4 R, 4 V, 707; 138/42, 43, 45, 46

[56] References Cited

U.S. PATENT DOCUMENTS

| | | | |
|---|---|---|---|
| 191,860 | 6/1877 | Jones | 138/46 X |
| 548,172 | 6/1897 | Browne | 138/46 |
| 1,619,444 | 3/1927 | Taylor | 73/707 X |
| 2,210,480 | 8/1940 | Brice | 138/42 |
| 3,047,005 | 7/1962 | Karr | 73/4 D X |
| 3,133,435 | 5/1964 | Lewis, Jr. | 73/4 D |
| 3,272,014 | 9/1966 | Miks et al. | 73/4 D X |
| 3,472,059 | 10/1969 | Pruett et al. | 73/4 D |
| 3,748,891 | 7/1973 | Music | 73/4 D |
| 4,413,524 | 11/1983 | Kosh | 73/707 |

FOREIGN PATENT DOCUMENTS

| | | | |
|---|---|---|---|
| 255745 | 7/1948 | Switzerland | 73/707 |
| 2314 | of 1890 | United Kingdom | 73/707 |
| 699379 | 11/1979 | U.S.S.R. | 73/707 |
| 757890 | 8/1980 | U.S.S.R. | 73/707 |
| 991106 | 1/1983 | U.S.S.R. | 138/42 |

OTHER PUBLICATIONS

"Pneumatic Tester; Type Pk; Portable—Self-Regulating—Dead Weight—Precision Pressure Source"; Bulletin 466PK; Publication by Mansfield & Green a Division of Ametek, Inc.; 2 pages; by Oct. 1966.

Primary Examiner—Stewart J. Levy
Assistant Examiner—Tom Noland
Attorney, Agent, or Firm—Robert P. Cogan

[57] ABSTRACT

A weight carrier rests on a floating ceramic ball supported within a nozzle by flow-regulated air. The air flows in an inlet path within the nozzle to support the ball and then exits through an outlet path downstream of the ball. A pressure regulator maintain a selected pressure in correspondence with a given weight on the ball. Dampening is provided in the nozzle itself rather than in a canister external thereto. Helical input and output paths wind around the axis of the nozzle to and from the ball. The cross section of the exit path increases with distance from the ball. The path may comprise an thread of increasing depth in an adjustment screw received in a cylindrical bore along the axis of the nozzle.

16 Claims, 5 Drawing Figures

PNEUMATIC DEADWEIGHT TESTER INCORPORATING DAMPENING MEANS

BACKGROUND OF THE INVENTION

The present invention relates to dampening means in apparatus for regulating fluid pressure and more particularly to deadweight pneumatic testers.

Pneumatic deadweight testers are utilized for creating a known, precise pressure in a pneumatic line. The deadweight tester is utilized to calibrate less expensive pressure measurement apparatus such as orifice meters. A significant application of orifice metering is measuring gas flow in pipelines. Both gas production and interstate delivery of gas may be measured. Accurate measurement is useful for both commercial purposes and for compliance with governmental production regulations of such hydrocarbon production regulating administrative entities such as the Texas Railroad Commission. Producers and pipeline operators can face regulatory sanctions for failure to maintain an adequate number of pressure measurement means and adequate periodic calibration. A very small percentage error in measurement of volume of gas delivered can mean a very large dollar error in its cost.

A common form of pressure meter is the bellows type manometer. This apparatus is commonly used to measure differential pressures corresponding to 20, 50, 100 and 200 inches of water. A body of literature covers the significance and requirements for proper measurement in the field. The American National Standards Institute has published ANSI-API 2530, Standard Orifice Metering of Natural Gas (formerly American Gas Association Report No. 3). Work in this area was begun by the American Gas Association in May 1924. Their report No. 1 was issued in 1930. Revisions preceding the current Standard were made in 1935, 1955 and 1977.

Not only does the Standard specify a procedure for calibration of orifice meters, it provides for a procedure for witnessing of calibration. The gas business commonly requires a witness to insure the accuracy and validity of measurement and physical tests. Documentation by the individual calibrator is insufficient. One of the minimum essential items necessary for a witness to perform his function properly is a deadweight tester.

A well-known form of deadweight tester widely used in the art is disclosed in U.S. Pat. No. 3,047,005 issued July 31, 1962 to R. J. Karr for Pressure Regulator. In that system, a vertically disposed nozzle is provided in which a ball rests on an arcuate seat. Input air enters through the nozzle and exits in annular passage surrounding the ball to lift the ball. Air exits through a vertical passage coaxial with the axis of the nozzle. A spider comprising a weight support rests on the ball. Karr explains that effective area of the ball is known and is substantially constant. The weight of the ball and the weight carrier are also constant. It is only necessary to place weights of a correct value on the weight carrier which combined with the weight of the ball and the carrier to produce the desired pressure in the outlet pneumatic line.

However, regulating apparatuses may have a resonant frequency. As Karr points out, the apparatus described may have a self-generating, self-oscillatory action that may tend to produce hunting of the outlet pressure in the exit line downstream of the ball. This would happen due to operation of the pressure regulating means which operate to keep the vertical position of the ball constant for a given total weight carried thereon. A feedback line in the pressure regulator would cause the regulator to reduce input pressure when the ball rises. However, the opposite should occur because by the time pressure is decreased, the ball will be falling. At such a time, an increase in pressure is desired in order to absorb the momentum of the ball and dampen its oscillation. Karr solves this problem by utilizing what is now well-known dampening means. A tank and coil arrangement are provided in which the outlet line enters a tank, tubing is wrapped around the access of the tank in a helical disposition for a given length and terminates within the tank. The outlet line continues at an outlet from the tank. The tank and coil arrangement gives the desired out-of-phase reaction to damp oscillations in the positioning of the ball.

As Karr points out, the optimum coil length may be determined empirically for each application. In a nominal application in which one-eighth inch tubing enters a nozzle six inches long, the dampening tank may be six inches in diameter and two inches deep. The coil therein may be a grand total of twelve feet long in sections of stepped diameter, for example 1/32 inch, 1/16 inch, 3/32 inch, and ⅛ inch. This construction is complex in that a great deal of tubing bending must be performed, different diameters of tubing must be assembled together and great care must be exercised not to produce kinks in the tubing in the bending operation. The size of the deadweight tester is also increased. This is disadvantageous in the field. Further, should liquid enter the system, they are not easily cleared from a long, small diameter length of tubing. Further, such dampening means are not readily adjustable to respond to new conditions. It is therefore desirable to provide a system with improved dampening means.

SUMMARY OF THE INVENTION

It is therefore an object of the present invention to provide a pneumatic deadweight testing means incorporating dampening means simplified in construction and reliable in operation.

It is a more specific object of the present invention to provide a deadweight tester incorporating dampening means which are built into a nozzle providing the pressure to support weights.

It is also an object of the present invention to provide a pneumatic deadweight tester which is stabilized and does not require external dampening means.

It is another, specific object of the present invention to provide a new nozzle for a deadweight tester which eliminates the need for use of a dampening tank and coil over selected ranges of operating conditons.

Further objects of the present invention in one form are to provide a pneumatic deadweight tester and nozzle for use therein wherein the length and volume of dampening means are adjustable.

Briefly stated, in accordance with the present invention, there is provided in a pneumatic deadweight tester having a nozzle with a pneumatic inlet and outlet in which a ball is supported by fluid flow means for dampening pressure variations without the need for an external tank arrangement. Inlet fluid is provided in a generally helical path concentric with the axis of the nozzle. Fluid exits radially interiorly thereof through an exit path surrounding the axis of the nozzle and defining a helix. The depth of the helix increases with linear distance from the exit port adjacent the ball. An extended exit fluid path which increases in cross sectional area is provided within the nozzle itself. Preferably, the exit fluid path may be comprised of a thread cut into a screw having constant outer diameter and increasing thread depth, which screw is received in the nozzle in a cylindrical bore in an inlet means, which inlet means is further housed in the nozzle.

BRIEF DESCRIPTION OF THE DRAWINGS

The means by which the foregoing objects and features of invention are achieved are pointed out in the claims forming the concluding portion of the specification. The invention, both as to its organization and manner of operation, may be further understood by reference to the following description taken in connection with the following drawings.

Of the drawings.

DESCRIPTION OF THE PREFERRED EMBODIMENTS

Figure 1:
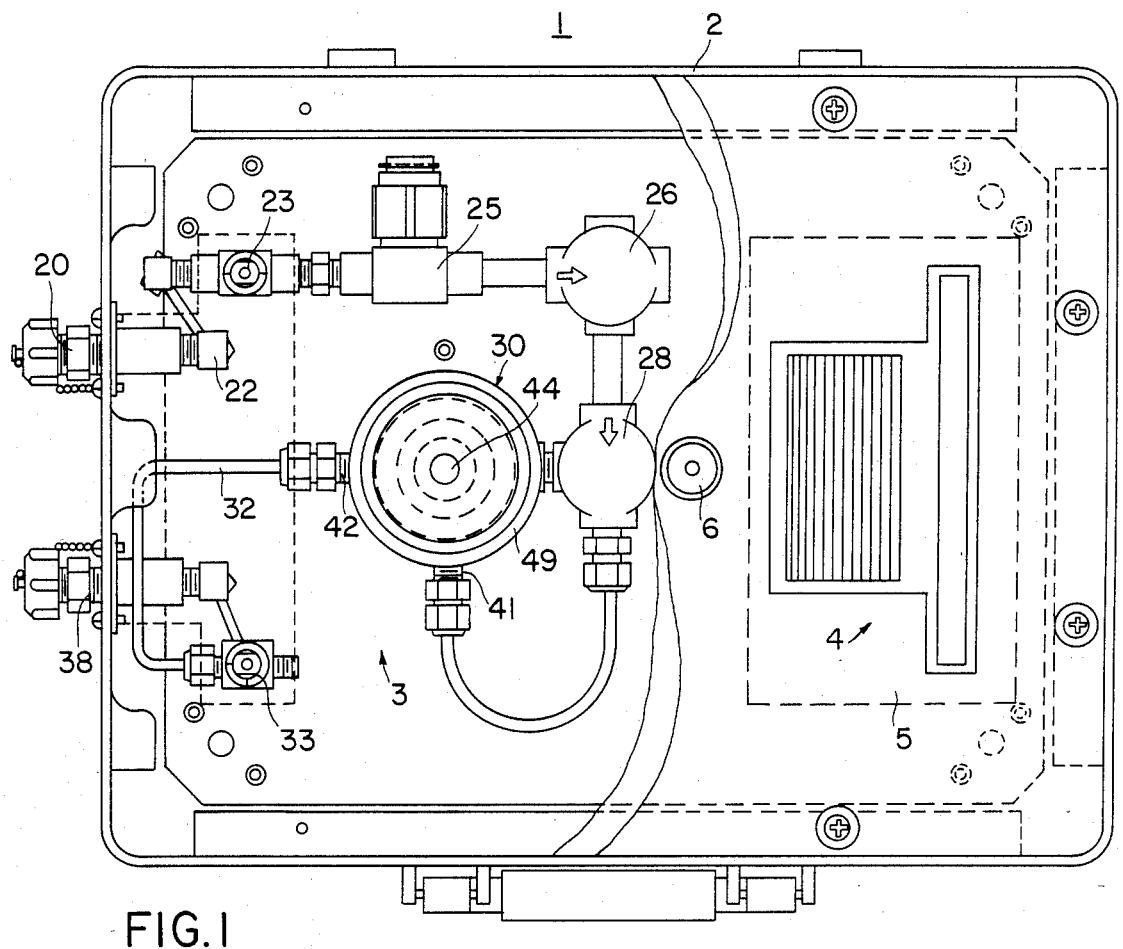
FIGS. 1 and 2 are respectively a plan view and an elevation, partially broken away, of an apparatus for field calibration of orifice metering devices which apparatus incorporates the present invention.
Figure 2:
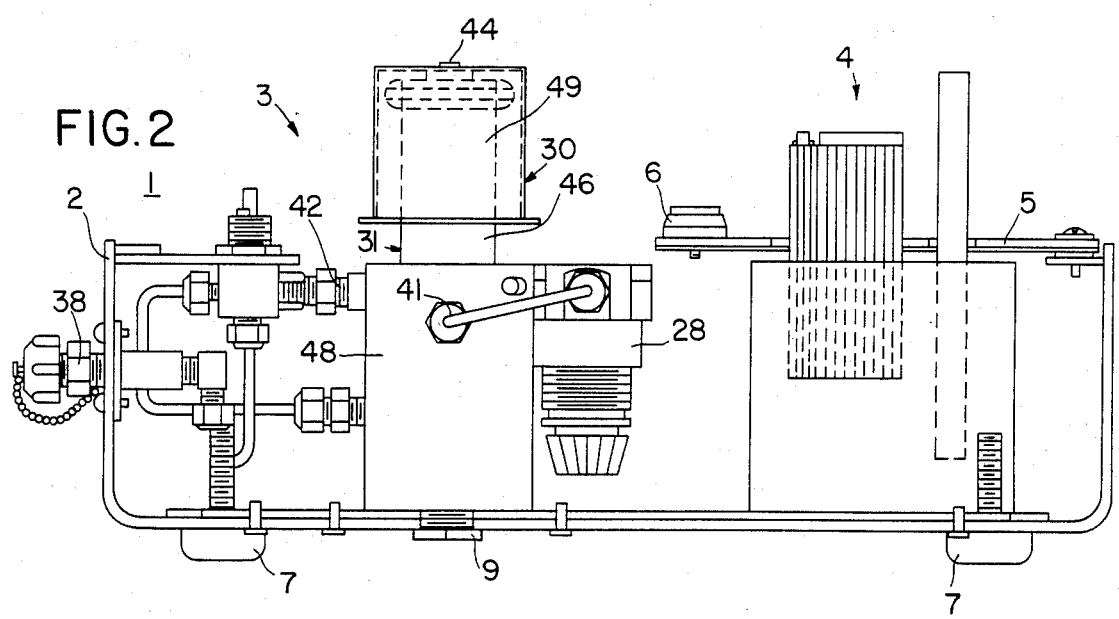

Referring to FIGS. 1 and 2, in which the same reference numerals are used to denote the same components, are respectively a plan and an elevation view of a deadweight testing apparatus 1 for field use in which a housing 2 contains the pneumatic circuit 3 and a set of weights 4 supported in the housing 2. A horizontal panel 5 supports a bubble level 6, and threaded feet 7 at the base of the housing 2 may be utilized to render the housing 2 level if the housing is supported on the feet 7. Alternatively, the housing 2 may be supported to a tripod mount 9 included in the base thereof.

The pneumatic circuit 3 is traced primarily with respect to FIG. 1. Inlet gas from a test source (not shown) is provided to an input port 20. Commonly the input fluid which will be pressurized in accordance with the deadweight is air. While not a gas of first choice, in some applications, ethane or natural gas, will be the gas to be pressurized. A low pressure gas bottle or nitrogen bottle could also be used. Gas is coupled from the inlet port 20 through conduit means 22 to a valve 23. The valve 23 may be utilized for enabling or disabling pressure measurements. Preferably a filter unit 25 is coupled between the valve 23 and a regulator 26. The regulator 26 is utilized to accept a wide range of inlet pressures and provides a controlled pressure output to a further regulator 28. The regulator 28 is connected in closed loop relationship for constant pressure maintenance in a deadweight unit 30. The deadweight unit 30 comprises a nozzle assembly 31. The regulator 28 is a prior art device operating in a well-known manner. Output from the deadweight unit 30 is coupled by conduit means 32 through a three way valve 33 to an output port 38. The three way valve 33 can vent the instrument under test (not shown) to atmospheric pressure to provide a baseline measurement.

Figure 3:
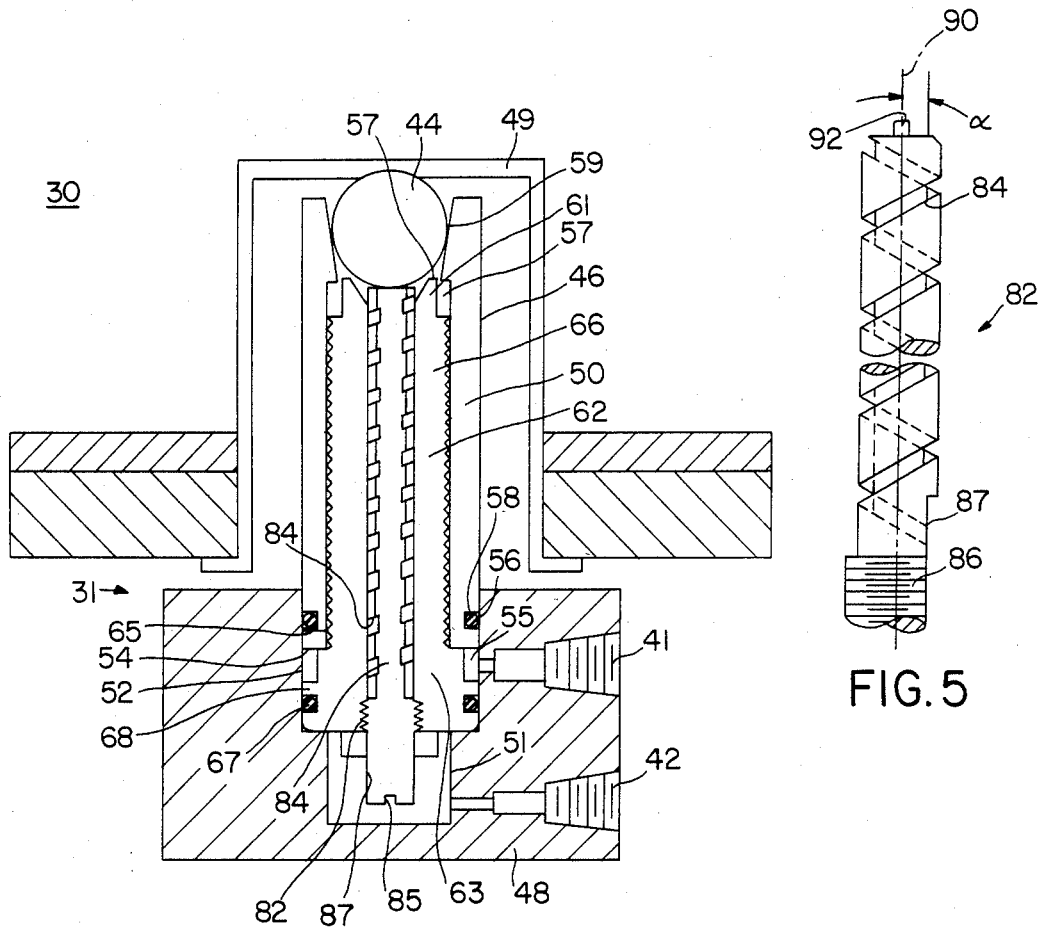
FIG. 3 is a cross sectional view of a deadweight unit.

As seen in FIG. 3 as well as FIGS. 1 and 2, the deadweight unit 30 includes an inlet means 41 and an outlet means 42. The flow from the inlet means 41 to the outlet means 42 is directed to support a pressure response means 44, hereinafter referred to as the ball 44. A sphere is the preferable form of pressure response means 44, although other shapes may be utilized. The ball 44 is supported on a vertically disposed nozzle 46 mounted to a nozzle base 48. The ball 44 supports a weight support means 49 comprising annular flange means having a first portion resting on the ball 44, a second portion surrounding the nozzle 46, and a third portion for supporting weights selected from the weight set. FIG. 3 represents an alternative embodiment in which the ball 44 does not project through the weight carrier 49.

In accordance with the present invention, dampening means are formed within the nozzle assembly 31. Elongated fluid paths are formed therein. The necessary length and volume thereof are selected in a well-known manner to provide for dampening under expected operating conditions. Parameters of dimensions are selected to account for expected conditions of pressure and temperature in operation.

The nozzle 46 comprises a nozzle housing 50 comprising a hollow cylinder received in a bore 52 communicating with the inlet means 41. A lower surface 54 of the nozzle housing 50 defines a chamber 55 in the bore 52 comprising a nozzle inlet area. A bore 51 coaxial with and extending downwardly from the bore 52 communicates with the outlet means 42. Sealing means such as in O-ring 56 in an annular groove 58 provide a fluid seal between the nozzle housing 50 and the nozzle base 48. Preferably, the nozzle housing 50 further comprises a tapered outlet aperture 59 for supporting the ball 44.

In order to define further passages, a core member 62 is provided. A portion 66 of the core member 62 received in the nozzle housing 50 has an outer diameter equal to the inner diameter of the nozzle housing 50, except for an upper extremity 61 thereof. What is meant by the same diameter in this context is that the core member 62 may be fit inside the nozzle housing 50 to provide fluid passages as further described below. The extremity 61 and upper end of the nozzle housing 50 cooperate to define a passage 57 which is the interface between the inlet and the exit paths. Fluid entering the passage 57 supports the ball 44. The lower portion of the core member 62 is received in the bore 52 and has a diameter equal to the bore 52. Another second portion 63 has a diameter less than that of the bore 52 and greater than that of the inner diameter of the nozzle housing 50. The portion 63 defines an inner diameter of an annular chamber 55. Sealing means such as an O-ring 67 in a groove 68 seal the chamber 55 from the bore 51, which bore 51 communicates with the outlet 42. A thread 65 is formed in the outer cylindrical surface of the portion 66 of the core member 62 to provide a fluid path from the chamber 55 to the passage 57.

Figure 5:
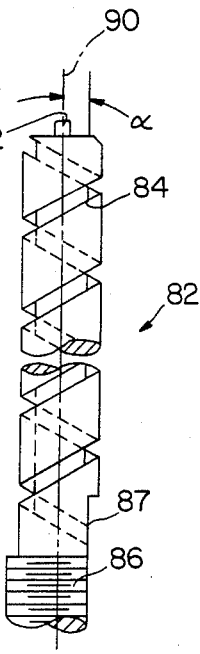
FIG. 5 is a further partial detailed view of the adjustment screw comprising exit path and dampening means.
Figure 4:
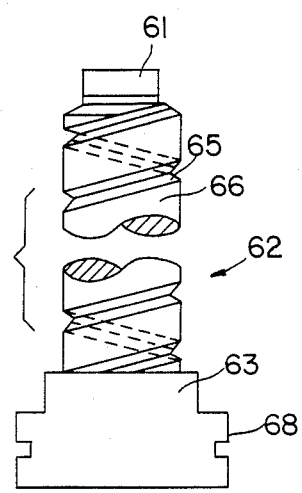
FIG. 4 is a partial detailed view of FIG. 3 illustrating the core member comprising inlet means in further detail.

The core member 62 is preferably formed with a smooth inner diameter and threaded at a lower end to receive an adjustment screw 82 which in accordance with the present invention will also comprise dampening means. As seen in FIGS. 3 and 5, the adjustment screw 82 has a helical groove, or thread, 84 formed therein to provide communication from the passage 57 adjacent the ball 44 to the chamber defined by the bore 51 communicating with the outlet means 42. The adjustment screw 82 is formed so that it may be fit to engage the inner diameter of the core member 62 and provide a helical fluid path. The adjustment screw 82 may be machined so that the thread depth increases with axial distance away from the ball 44 and toward the bore 51.

The base of the thread 84 defines an angle alpha with the axis 90 of the nozzle 46. Slot means 85 are formed in the base of the adjustment screw 82 so that the adjustment screw 82 may be angularly rotated along conventional screw threads 86 with respect to the core member 62. The adjustment screw 82 is rotated to position the ball 44 vertically such that locking of the ball 44 in the tapered outlet aperture 59 is prevented. In a further form, the adjustment screw 82 is also used to adjust the total length and total volume of the exit path from the ball 44. The threaded portion 86 may be truncated by a flat keyway 87 to provide a fluid path from the groove 84 to the bore 51.

As explained above, empirical determination of the optimum path for dampening purposes may be done. It is particularly advantageous in the present invention to provide for adjustment of the exit path length. This is done by simply removing the nozzle 46, core unit 62 and adjustment screw 82 from the nozzle base 48. Note that this adjustment can be made even after the unit is in the field. Such adjustment is to be contrasted to dampening means comprising a coil in a tank. Such apparatus commonly is not disassemblable. Further, there is difficulty in trimming the tubing and greater difficulty in adding back what may already have been cut off.

As further seen in FIG. 3, a further convenience is provided in that the adjustment screw 82 may further have at its upper end a further pin insert 92 along the axis thereof for supporting the ball 44. Use of the pin 92 conveniently permits provision of a clearance between the ball 44 and the nozzle assembly 46 even when no pressure is provided. This results in simplification of construction of seat means for the ball 44. Axial projection of the pin 92 from the adjustment screw 82 may be preselected to maintain a desired vertical position of the ball 44 after rotation of the adjustment screw 82 to adjust the length of the groove 84.

The invention provides for extended input and/or output path means within the nozzle itself to provide dampening within the nozzle itself. While concentric paths have been illustrated and are more readily provided, other forms will suggest themselves to those skilled in the art. Assembly and adjustability are facilitated.

What is claimed is new and desired to be secured by Letters Patent of the United States is:

1. In a deadweight testing system comprising nozzle means, inlet means in said nozzle means, pressure responsive means for supporting preselected weights, and fluid outlet means the improvement wherein said outlet means comprises a substantially helical path extending from the area adjacent said pressure responsive means along an axis of the nozzle to an exit port, said helical exit path means having increasing cross section with distance from said pressure responsive means, whereby said exit path means comprises dampening means.

2. The improvement according to claim 1 wherein said exit path is defined by a thread on a cylindrical means received in a bore concentric with the longitudinal axis of said nozzle.

3. The improvement according to claim 2 wherein said cylindrical body comprises an adjustment screw rotatable within said bore such that the length of the exit path therein is adjustable.

4. A nozzle in a deadweight pneumatic tester comprising a nozzle housing having a bore therein and receiving a first cylindrical insert having a thread therein and defining a helical fluid path between said insert and said cylinder housing, said first insert having outlet means formed in a central portion thereof, said outlet means further comprising dampening means comprising a fluid path substantially helically disposed and having non-uniform cross section.

5. The apparatus according to claim 4 wherein said dampening means comprises a cylindrical body having a thread cut in the surface thereof and received in a central bore of said first cylindrical insert.

6. Apparatus according to claim 5 wherein said thread depth in said cylindrical body increases monotonically with axial distance.

7. In a nozzle assembly for a deadweight tester having a supportive pressure responsive means comprising dampening means wherein said dampening means comprises fluid path means having a length and volume selected for dampening and formed in a preselected spatial relationship to a vertical axis of said nozzle assembly, said fluid path means being defined by first and second relatively moveable members inside said nozzle assembly.

8. The nozzle assembly of claim 7 wherein said fluid path means comprise concentric helical inlet and exit paths.

9. The nozzle assembly of claim 8 wherein at least one of said concentric helical paths is defined by a smooth inner diameter of a generally cylindrical component of the nozzle assembly and a threaded cylindrical body received therein.

10. The nozzle assembly of claim 9 wherein said fluid exit path is received in a bore concentric the longitudinal axis of said nozzle assembly.

11. The nozzle assembly of claim 10 wherein the cylindrical component defining said exit path comprises an adjustment screw rotatable within said bore such that the volume of the exit path therein is adjustable.

12. A deadweight tester comprising fluid inlet and outlet means, pressure regulating means connected in closed loop relationship to a nozzle assembly and said nozzle assembly comprising dampening means comprising fluid path means having a length and volume selected for dampening and formed in a preselected spatial relationship to a vertical axis of said nozzle assembly, said fluid path means being defined by first and second relatively moveable members inside said nozzle assembly.

13. The deadweight tester according to claim 12 wherein said fluid path means comprise concentric helical inlet and outlet paths.

14. The deadweight tester according to claim 13 wherein at least one of said concentric helical paths is defined by a smooth inner diameter of a generally cylindrical component of the nozzle assembly and a threaded cylindrical body received therein.

15. The deadweight tester according to claim 14 wherein said fluid exit path is received in a bore concentric with the longitudinal axis of said nozzle assembly.

16. The deadweight tester according to claim 15 wherein said cylindrical component comprises an adjustment screw rotatable within said bore such that the volume of the exit path therein is adjustable.

* * * * *